US011683515B2

(12) United States Patent
Jiang et al.

(10) Patent No.: US 11,683,515 B2
(45) Date of Patent: Jun. 20, 2023

(54) VIDEO COMPRESSION WITH ADAPTIVE ITERATIVE INTRA-PREDICTION

(71) Applicant: TENCENT AMERICA LLC, Palo Alto, CA (US)

(72) Inventors: Wei Jiang, San Jose, CA (US); Wei Wang, Palo Alto, CA (US); Ding Ding, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/486,533

(22) Filed: Sep. 27, 2021

(65) Prior Publication Data

US 2022/0239935 A1     Jul. 28, 2022

Related U.S. Application Data

(60) Provisional application No. 63/142,377, filed on Jan. 27, 2021.

(51) Int. Cl.
| | |
|---|---|
| *H04N 19/44* | (2014.01) |
| *H04N 19/119* | (2014.01) |
| *H04N 19/70* | (2014.01) |
| *H04N 19/176* | (2014.01) |
| *H04N 19/159* | (2014.01) |
| *G06N 3/02* | (2006.01) |

(52) U.S. Cl.
CPC ............... *H04N 19/44* (2014.11); *G06N 3/02* (2013.01); *H04N 19/119* (2014.11); *H04N 19/159* (2014.11); *H04N 19/176* (2014.11); *H04N 19/70* (2014.11)

(58) Field of Classification Search
None
See application file for complete search history.

(56) References Cited

U.S. PATENT DOCUMENTS

2022/0103839 A1\*   3/2022   Van Rozendaal .... H04N 19/463
2022/0191531 A1\*   6/2022   Sim ........................ H04N 19/86

\* cited by examiner

*Primary Examiner* — Lindsay J Uhl
(74) *Attorney, Agent, or Firm* — Arentfox Schiff LLP (57) ABSTRACT

A method of video decoding at a video decoder can include receiving one or more syntax elements associated with a current first block that belongs to a plurality of first blocks partitioned from a picture, the one or more syntax elements indicating an optimal partition indicating how the current first block is partitioned into second blocks for intra-prediction, a set of block selection signals, wherein the current first block is re-partitioned into third blocks, each block selection signal corresponds to one of the third blocks and indicates whether the respective third block is coded using a first coding method or a second coding method, and a set of compressed representations each corresponding to one of the third blocks. The current first block can be reconstructed based on the one or more syntax elements to generate a reconstructed current first block.

20 Claims, 8 Drawing Sheets

VIDEO COMPRESSION WITH ADAPTIVE ITERATIVE INTRA-PREDICTION

INCORPORATION BY REFERENCE

This present disclosure claims the benefit of priority to U.S. Provisional Application No. 63/142,377, "Neural Image Compression with Adaptive Iterative Intra-prediction" filed on Jan. 27, 2021, which is incorporated by reference herein in its entirety.

TECHNICAL FIELD

The present disclosure describes embodiments generally related to video coding based on artificial neural networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A neural network is based on a collection of connected nodes (also referred to as neurons), which loosely model the neurons in a biological brain. The neurons can be organized into multiple layers. Neurons of one layer can connect to neurons of the immediately preceding and immediately following layers.

A connection between two neurons, like the synapses in a biological brain, can transmit a signal from one neuron to the other neuron. A neuron that receives a signal then processes the signal and can signal other connected neurons. In some examples, to find the output of a neuron, inputs to the neuron are weighted by the weights of the connections from the inputs to the neuron, and the weighted inputs are summed to generate a weighted sum. A bias may be added to the weighted sum. Further, the weighted sum is then passed through an activation function to produce the output.

International Organization for Standardization (ISO) and International Electrotechnical Commission (IEC) Moving Picture Experts Group (MPEG) (JTC 1/SC 29/WG 11) has been actively searching for potential needs for standardization of future video coding technology. ISO/IEC Joint Photographic Experts Group (JPEG) has established a JPEG Artificial Intelligence (AI) group focusing on AI-based end-to-end neural image compression using Neural Networks (NNs). Some companies have funded specialized research projects for Neural Image Compression (NIC). The Chinese Audio Video Standard (AVS) has also formed an AVS-AI special group to work on neural image and video compression technologies. The success of recent approaches has brought more and more industrial interests in advanced neural image and video compression methodologies.

SUMMARY

Aspects of the disclosure provide a method of video encoding at a video encoder. The method can include partitioning a picture into a plurality of first blocks, processing a current first block that belongs to the plurality of first blocks to generate the following outputs: an optimal partition indicating how the current first block is partitioned into second blocks for intra-prediction, a set of block selection signals, wherein the current first block is re-partitioned into third blocks, and each block selection signal corresponds to one of the third blocks and indicates whether the respective third block is coded using a first coding method or a second coding method, and a set of compressed representations each corresponding to one of the third blocks, and encoding the outputs to generate coded bits corresponding to the picture.

In an embodiment, an estimated block of the current first block partitioned with the optimal partition is generated based on an iterative prediction estimation neural network (NN). The estimated block includes estimated second blocks corresponding to the second blocks. In an embodiment, for each third block that is coded using the first coding method, the estimated second blocks in the respective third block are encoded, based on a neural compression NN, to generate the respective compressed representation of the respective third block. For each third block that is coded using the second coding method, an intra-prediction is performed to generate a residual block for each second block in the respective third block, and the residual blocks of the respective third block are compressed, based on a residual neural compression NN, to generate the respective compressed representation of the respective third block.

In an embodiment, the intra-prediction to generate the residual block for each second block in the respective third block is based on estimated second blocks processed prior to the estimated second block of the respective second block in the estimated block of the current first block, and one or more estimated blocks of the first blocks that are processed prior to the current first block.

In an embodiment, the estimated block of the current first block partitioned with the optimal partition can be generate based on the iterative prediction estimation NN in the following steps: in a current iteration, using a set of current estimated second blocks of the current first block and optionally estimated blocks of the first blocks that are processed prior to the current first block as an input to an intra-prediction NN to generate predicted second blocks corresponding to the current estimated second blocks of the current first block, generating residual second blocks corresponding to the predicted second blocks, re-partitioning a collection of the residual second blocks into residual third blocks corresponding to the third blocks, compressing the residual third blocks based on a residual neural compression NN to generate compressed third blocks, decompressing the compressed third blocks based on a residual neural decompression NN to recover the residual third blocks, and combining the recovered residual third blocks with the corresponding predicted second blocks to generate reconstructed second blocks. The reconstructed second blocks are used in place of the set of current estimated second blocks as an input to a next iteration.

In an embodiment, for each third block, a first rate-distortion (R-D) loss corresponding to the third block being encoded with the first coding method and a second R-D loss corresponding to the third block being encoded with the second coding method are determined. Based on the first and second R-D losses, the block selection signal of the third block can be determined to indicate which one of the first and second coding methods is selected for coding the third block.

In an embodiment, the processing further comprises determining a first overall loss of the current first block corresponding to the optimal partition for partitioning the current first block into the second blocks, the first overall loss being a combination of an R-D loss of each third block corresponding to the selected one of the first and second coding methods for the respective third block, determining a second overall loss of the current first block corresponding to each of a plurality of different ways, other than the optimal partition, for partitioning the current first block into second blocks, and comparing the first and second overall losses to determining the first overall loss of the current first block corresponding to the optimal partition is the smallest loss among the first and second overall losses.

Aspects of the disclosure further provide a method of video decoding at a video decoder. The method can include receiving one or more syntax elements associated with a current first block that belongs to a plurality of first blocks partitioned from a picture, the one or more syntax elements indicating an optimal partition indicating how the current first block is partitioned into second blocks for intra-prediction, a set of block selection signals, wherein the current first block is re-partitioned into third blocks, each block selection signal corresponds to one of the third blocks and indicates whether the respective third block is coded using a first coding method or a second coding method, and a set of compressed representations each corresponding to one of the third blocks. The current first block can be reconstructed based on the one or more syntax elements to generate a reconstructed current first block.

In an embodiment, the reconstructing comprises for each third block that is coded using the first coding method as indicated by a respective one of the set of block selection signals, generating a reconstructed third block based on a neural decompression NN with the respective compressed representation of the third block as an input to the neural decompression NN, and for each third block that is coded using the second coding method as indicated by a respective one of the set of block selection signals, generating a residual third block based on a residual neural decompression NN with the respective compressed representation of the third blocks as an input to the residual neural decompression NN.

In an embodiment, the reconstructing further comprises for each third block that is coded using the second coding method, generating a reconstructed third block based on the respective residual third block and a respective predicted third block.

In an embodiment, the reconstructing further comprises, for each third block coded using the second coding method, performing an intra-prediction based on an intra-prediction NN with previously reconstructed first blocks and previously generated reconstructed third blocks as an input to the intra-prediction NN to generate a set of predicted second blocks corresponding to the respective third block.

In an embodiment, the set of predicted second blocks correspond to the respective third block forms the respective predicted third block. The reconstructing further comprises for each third block that is coded using the second coding method, the respective intra-prediction is performed with the optimal partition, indicating how the current first block is partitioned into second blocks for intra-prediction, as an input to the intra-prediction NN. In an embodiment, the reconstructing further comprises merging the reconstructed third blocks corresponding to the third blocks that are coded using either the first or second coding method to generate the reconstructed current first block.

Aspects of the disclosure further provide a non-transitory computer-readable medium storing instructions that, when executed by a processor, cause the processor to perform the method of video encoding or decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Neural Image Compression and Block-Based Intra-Prediction and Residual Coding This disclosure provides a Neural Image Compression (NIC) framework of compressing an input image by a Neural Network (NN) (or a set of NNs) using a block-based intra-prediction mechanism with adaptive block sizes. Also, residual coding and intra-prediction can be performed based on different block partitions. Further, the NIC framework can adaptively select one of two candidate coding methods for each coding block. While image encoding and decoding examples are described for illustration of certain aspects of the disclosure, the technologies described herein can be applied to the field of video coding and decoding directly or with adaptation based on the principles disclosed herein.

In some embodiments, given an input image x, the target of NIC is to use the image x as the input to an NN encoder to compute a compressed representation $\bar{y}$ that is compact for storage and transmission, and then, use $\bar{y}$ as the input to an NN decoder to reconstruct an image $\bar{x}$. In some examples, a NIC method can take a Variational Autoencoder (VAE) structure, where the NN encoders directly use the entire image x as its input, which is passed through a set of network layers that work as a black box to compute the output representation $\bar{y}$. Correspondingly, the NN decoders take the entire representation $\bar{y}$ as its input, which is passed through another set of network layers that work like another black box to compute the reconstructed $\bar{x}$.

In some embodiments, instead of directly encoding the original whole image, the block-based intra-prediction and residual coding mechanism can be adopted, which is highly effective for compressing image frames in video coding systems. In an example, the entire images are partitioned into blocks of various sizes, and a prediction block is generated by copying the boundary pixels of previous compressed blocks along a variety of angular directions, and then the residuals between the original block and the prediction block are compressed. Residuals can be much more efficiently encoded than the original pixels, and better coding performance can be achieved. Different block sizes can have direct impact on the compression performance, and the optimal block size usually depends on specific images.

II. Neural Image Compression with Intra-Prediction Residuals

This disclosure provides a NIC framework using block-based intra-prediction with adaptive block sizes. The NIC framework can encode residuals between prediction blocks and the original blocks (or estimated blocks derived based on the original blocks) instead of encoding the original pixels, and the block size is adaptively determined based on the compression quality such as a Rate-Distortion (R-D) loss.

Figure 1:
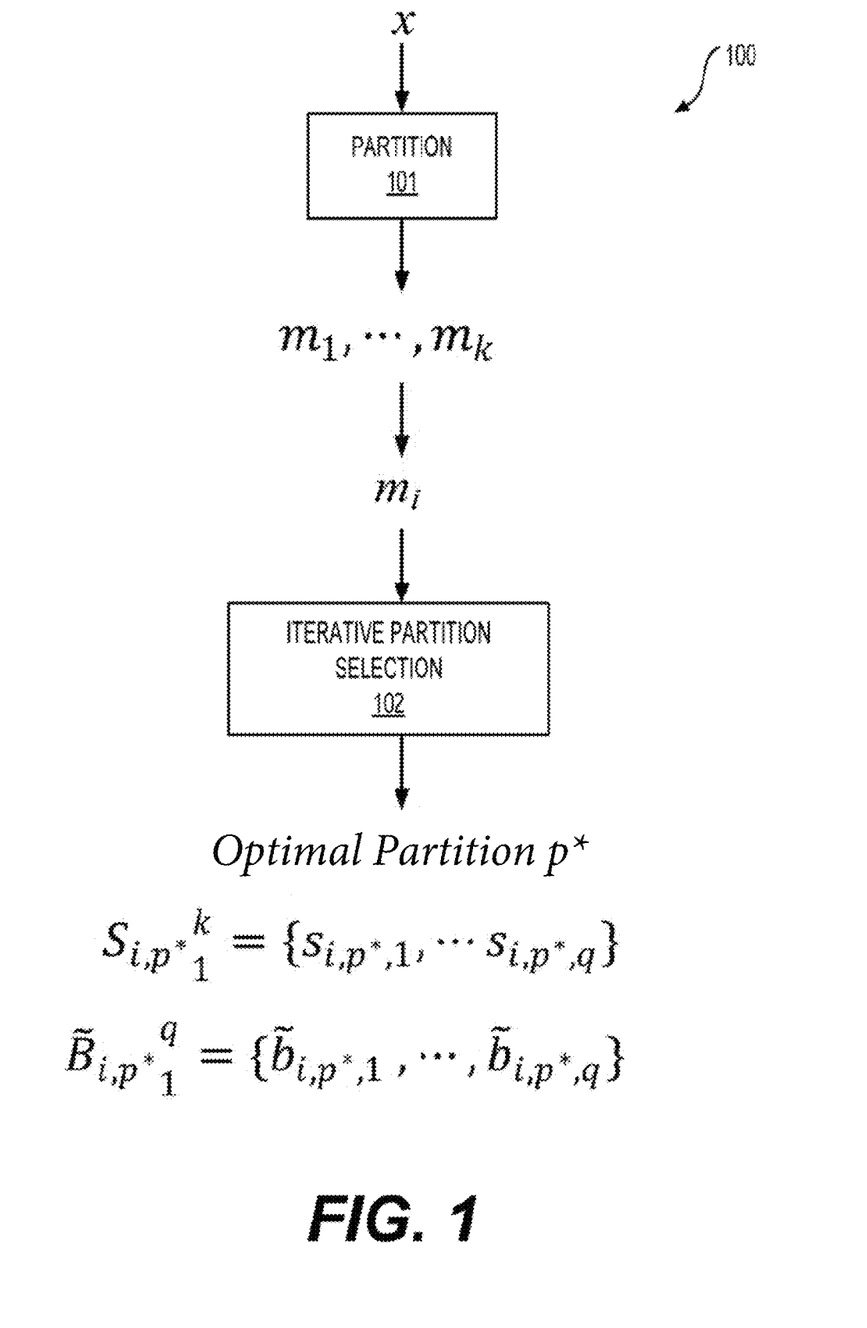
FIG. 1 shows an exemplary workflow (100) of an encoder according to embodiments of the disclosure.

FIG. 1 shows an exemplary workflow (100) of an encoder according to embodiments of the disclosure. The encoder can operate as a video encoder or an image encoder. The encoder can include a Partition module (101) and an Iterative Partition Selection module (102). An input image x can first be partitioned in the Partition module (101) into k micro-blocks, denoted $M_1^k = \{m_1, \ldots, m_k\}$, where $m_i$ denotes the i-th micro-block. Each $m_i$ can have a size of $(w_m, h_m)$ and be further partitioned into blocks $b_{i,1} \ldots, b_{i,n}$, where $b_{i,j}$ is the j-th block in $m_i$. The size of the block $b_{i,j}$ can vary or be the same for different blocks $b_{i,j}$ and different micro-blocks $m_i$ can be partitioned in different ways. In an embodiment, the micro-blocks align with the Coding Tree Unit (CTU) partition in current video coding tools, such as High Efficiency Video Coding (HEVC) or Versatile Video Coding (VVC). Each CTU micro-block can have a choice of being further partitioned into blocks having various sizes, such as 2×2, 4×4, 8×8, 16×16, 32×32 or 64×64 pixels. This disclosure does not put any restrictions on the size of the CTU micro-block or the choices of how blocks in the CTU micro-block are partitioned.

Assume that for each micro-block $m_i$, there can be P different ways to partition the micro-block $m_i$ into blocks (referred to as intra-prediction blocks), for example, for the purpose of intra-prediction. The Iterative Partition Selection module (102) can determine the optimal way (denoted p*) for partitioning micro-block $m_i$.

In addition, a re-partition can be performed in the workflow (100) to partition the micro-block $m_i$ into blocks (referred to as re-partitioned blocks), for example, for residual coding or switching coding methods. Because of these two partitions—partition for intra-prediction and re-partition for residual coding and switching coding methods, intra-prediction and residual coding can be performed based on blocks having different sizes. Typically, intra-prediction can have higher efficiency with allowable smaller block sizes, while residual coding can have higher efficiency with allowable larger block sizes. The coding framework disclosed herein provides the capability of decoupling the intra-prediction block sizes from the residual coding block sizes, thus improving image or video coding efficiency.

In some embodiments, for each re-partitioned block, the Iterative Partition Selection module (102) can select a coding method from two candidate coding methods for encoding the respective re-partitioned blocks. For example, the selection can be based on a Rate-Distortion (R-D) based quality loss calculated for each of the two candidate methods for coding the same re-partitioned block. The results of this selection can be indicated by a block selection signal associated with each re-partitioned block. For example, a block selection signal having a first value (for example, 1) can indicate a first coding method is applied to the respective re-partitioned block, while a block selection signal having a second value (for example, 0) can indicate a second coding method is applied to the respective re-partitioned block.

As shown in FIG. 1, the output of the Iterative Partition Selection module (102) includes the optimal way of partition p*, a set of block selection signals $S_{i,p^*_1}{}^q = \{s_{i,p^*,1}, \ldots, s_{i,p^*,q}\}$, and a set of compressed representations $\hat{B}_{i,p^*_1}{}^q = \{\hat{b}_{i,p^*,1}, \ldots, \hat{b}_{i,p^*,q}\}$, where q denotes the number of re-partitioned blocks. Each compressed representation can correspond to one re-partitioned block. These outputs can be sent to a decoder side or a storage system (typically after being further compressed by, for example, quantization and entropy coding).

Figure 2:
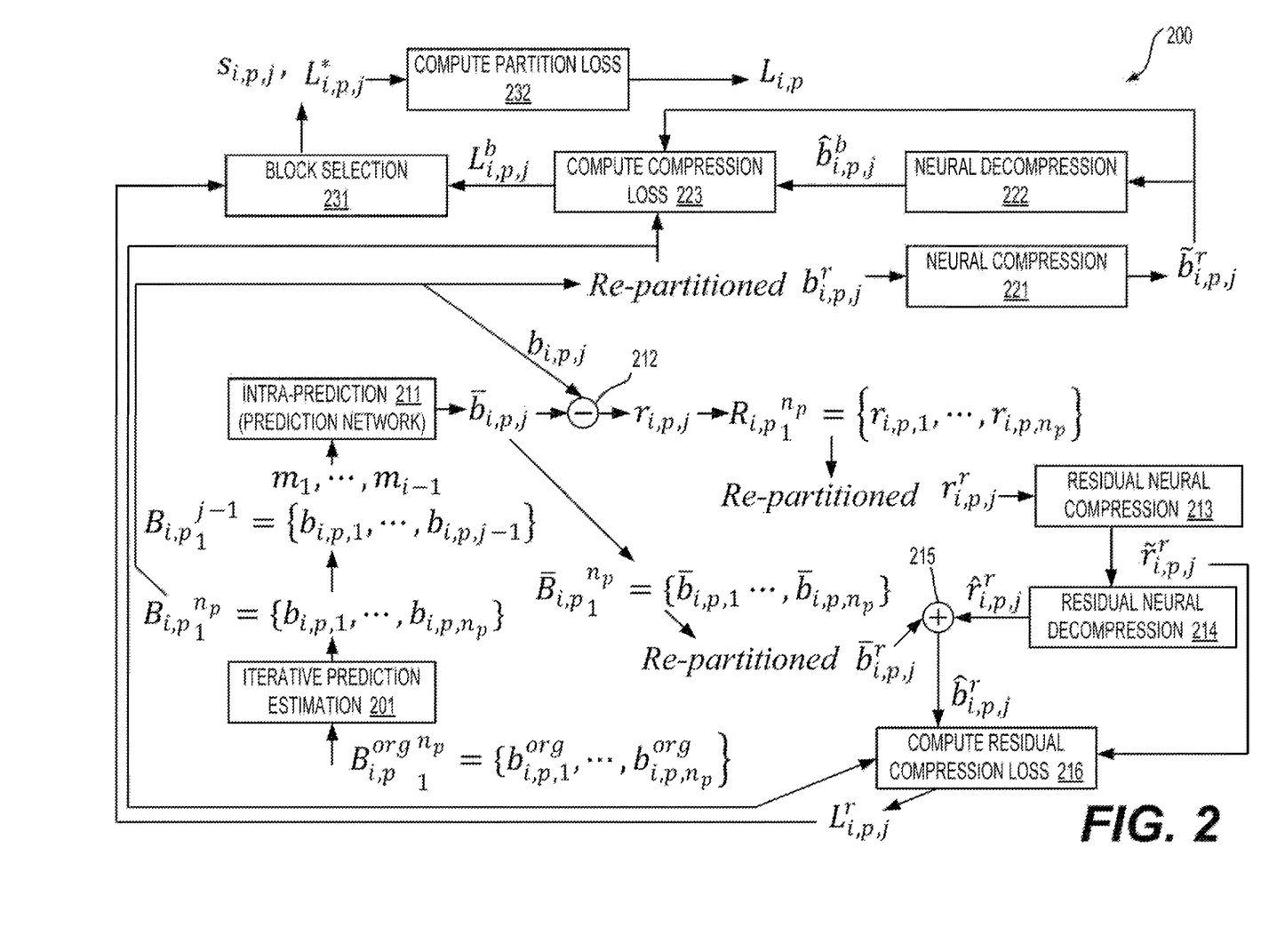
FIG. 2 shows an exemplary workflow (200) of the Iterative Partition Selection module (102) according to embodiments of the disclosure.

FIG. 2 shows an exemplary workflow (200) of the Iterative Partition Selection module (102) according to embodiments of the disclosure. In the FIG. 2 example, the Iterative Partition Selection module (102) can include an Iterative Prediction Estimation module (201), an Intra-Prediction module (211), a Residual Neural Compression module (213), a Residual Neural Decompression module (214), a Compute Residual Compression Loss module (216), a Neural Compression module (221), a Neural Decompression module (222), a Compute Compression Loss module (223), a Block Selection module (231), a Compute Partition Loss module (232), a first Addition module (212), and a second Addition module (215). Those elements are coupled together as shown in FIG. 2.

Let $B_{i,p_1}{}^{org^n p} = \{b_{i,p,1}{}^{org}, \ldots, b_{i,p,n_p}{}^{org}\}$ denote intra-prediction blocks obtained by the p-th way of partition of the micro-block $m_i$ in original input x. In an example, the total number of blocks $n_p$ for this partition can be determined by the size of the micro-block and the sizes of the intra-prediction blocks. As noted above, there can be P different ways to partition the micro-block $m_i$. For each way of partition, the resulting intra-prediction blocks can have a same size or different sizes. For each way of partition, denoted p, the workflow (200) can be run once to determine an overall quality loss Lip. Based on those overall quality losses, the optimal way (denoted p*) for partitioning micro-block $m_i$ can be determined from the P different partition ways.

The Iterative Prediction Estimation module (201) can be employed to first compute an estimated micro-block corresponding to the original micro-block $m_i$ by using an iterative intra-prediction mechanism. The estimated micro-block can include estimated intra-prediction blocks, denoted $B_{i,p_1}{}^{n_p} = \{b_{i,p,1}, \ldots, b_{i,p,n_p}\}$, corresponding to the original intra-prediction blocks $B_{i,p_1}{}^{org^n p} = \{b_{i,p,1}{}^{org}, \ldots, b_{i,p,n_p}{}^{org}\}$. The estimated intra-prediction blocks can be used as a better basis for subsequent processing in the workflow (200) than the original intra-prediction blocks in terms of coding efficiency and performance (for example, indicated by an R-D loss).

Then, for each estimated partitioned block $b_{i,p,j}$, a predicted block $\bar{b}_{i,p,j}$ can be computed by the Intra-Prediction module (211) based on a Prediction Network (an NN for intra-prediction). The Prediction Network takes as input a set of image pixels that come from the estimated blocks $B_{i,p_1}{}^{j-1} = \{b_{i,p,1}, \ldots, b_{i,p,j-1}\}$ in the current $m_i$ that are encoded before $b_{i,p,j}$. In some embodiments, the input of the Prediction Network can also come from the estimated micro-blocks that are encoded before $m_i$. In different examples, reconstructed micro-blocks can be used in place of the estimated micro-blocks as input to the Intra-Prediction module (211).

There can be many ways to select the pixels and form the input of the Prediction Network. For example, the neighboring pixels that are spatially closest to $b_{i,p,j}$ in a context area can be organized in some order (stacking, concatenation, spatially transformed, or the like) to form the input to the Prediction Network. The Intra-Prediction module 211 can choose to skip the prediction process of the blocks on the boundary without sufficient pixel context. Or, the Intra-Prediction module 211 can pad the micro-block for prediction of the blocks on the boundary. Through inference computation, the Prediction Network outputs the predicted block $\overline{b}_{i,p,j}$.

The Prediction Network can have various architectures in various embodiments. For each way of partition, the Prediction Network can use a different NN model for its prediction in some embodiments. Typically, convolutional and fully connected layers can be used. This disclosure does not put any restrictions on the size and shape of the context area for pixel selection, the way how pixels are transformed into the input of the Prediction Network, or the network architectures of the Prediction Network.

For the block $b_{i,p,j}$, after computing the predicted block $\overline{b}_{i,p,j}$, a residual $r_{i,p,j}$ can be computed based on $b_{i,p,j}$ and $\overline{b}_{i,p,j}$, for example, by subtraction at the Addition module (212). Let $R_{i,p_1}^{n_p} = \{r_{i,p,1}, \ldots, r_{i,p,n_p}\}$ denote the residual of the entire i-th micro-block $m_i$ partitioned in the p-th way. This residual $R_{i,p_1}^{n_p}$ can be re-partitioned into a set of q residual blocks $R_{i,p_1}^{q} = \{r_{i,p,1}^{r}, \ldots, r_{i,p,q}^{r}\}$. These q residual blocks are referred to as re-partitioned residual blocks. Note that the re-partitioning of the q residual blocks can be the same or different from the original partitioning of the $n_p$ predicted blocks (or intra-prediction blocks). When q=1, the entire micro-block will be processed as one piece. The corresponding estimated micro-block $B_{i,p_1}^{n_p} = \{b_{i,p,1}, \ldots, b_{i,p,n_p}\}$ and the predicted blocks $\overline{B}_{i,p_1}^{n_p} = \{\overline{b}_{i,p,1}, \ldots, \overline{b}_{i,p,n_p}\}$ can also be re-partitioned in the same way into $B_{i,p_1}^{q} = \{b_{i,p,1}^{r}, \ldots, b_{i,p,q}^{r}\}$ (referred to as re-partitioned estimated blocks) and $\overline{B}_{i,p_1}^{q} = \{\overline{b}_{i,p,1}^{r}, \ldots, \overline{b}_{i,p,q}^{r}\}$ (referred to as re-partitioned predicted blocks), respectively, as indicated in FIG. 2.

For each rep-partitioned residual block $r_{i,p,j}^{r}$, the Residual Neural Compression module (213) compresses the respective residual block $r_{i,p,j}^{r}$ to compute a compressed representation $\tilde{r}_{i,p,j}^{r}$, which is decompressed by the Residual Neural Decompression module (214) to compute a recovered residual block $\hat{r}_{i,p,j}^{r}$. The recovered residual block can be added back to the corresponding re-partitioned predicted block $\overline{b}_{i,p,j}^{r}$ to obtain a reconstructed block $\hat{b}_{i,p,j}^{r}$.

A residual compression quality loss $L_{i,p,j}^{r}$ can be computed based on the re-partitioned estimated block $b_{i,p,j}^{r}$ (including the estimated intra-prediction blocks), the reconstructed block $\hat{b}_{i,p,j}^{r}$ and the compressed representation $\tilde{r}_{i,p,j}^{r}$ in the Compute Residual Compression Loss module. For example, in an embodiment, the Rate-Distortion (R-D) loss can be computed as the quality measurement:

$$L_{i,p,j}^{r} = \lambda D(b_{i,p,j}^{r}, \hat{b}_{i,p,j}^{r}) + R(\tilde{r}_{i,p,j}^{r}) \quad (1)$$

where $D(b_{i,p,j}^{r}, \hat{b}_{i,p,j}^{r})$ is the distortion between $b_{i,p,j}^{r}, \hat{b}_{i,p,j}^{r}$. $R(\tilde{r}_{i,p,j}^{r})$ is the rate loss measuring the bit consumption of the compressed $\tilde{r}_{i,p,j}^{r}$. $\lambda$ is a trade-off hyperparameter balancing the importance of different terms. Other compression quality loss can certainly be used here. This disclosure does not put any restrictions on the specific measurement used for the compression quality loss, the distortion, or the rate loss.

At the same time, each re-partitioned estimated block $b_{i,p,j}^{r}$ (including the original estimated intra-prediction blocks) can be directly compressed by the Neural Compression module (221) to compute a compressed representation $\tilde{b}_{i,p,j}^{r}$, which is decompressed by the Neural Decompression module (222) to compute a recovered block $\hat{b}_{i,p,j}^{b}$ directly.

A compression quality loss $L_{i,p,j}^{b}$ can be computed in the Compute Compression Loss module (223) based on $b_{i,p,j}^{r}$, $\hat{b}_{i,p,j}^{b}$ and $\tilde{b}_{i,p,j}^{r}$ in a similar way as the residual quality loss $L_{i,p,j}^{r}$. Based on $L_{i,p,j}^{b}$ and $L_{i,p,j}^{r}$, a Block Selection module (231) generates a selection signal $s_{i,p,j}$ to indicate whether the re-partitioned residual block $r_{i,p,j}^{r}$ or the original re-partitioned estimated block $b_{i,p,j}^{r}$ will be used to generate the compressed $\tilde{r}_{i,p,j}^{r}$ or $\tilde{b}_{i,p,j}^{r}$, for example, by selecting the option with less quality loss. This gives the optimal quality loss $L^*_{i,p,j}$ for compressing the current j-th block $b_{i,p,j}^{r}$, for example, $L^*_{i,p,j} = \min(L_{i,p,j}^{b}, L_{i,p,j}^{r})$.

The Compute Partition Loss module (232) can compute the overall quality loss $L_{i,p}$ for the p-th way of partition of micro-block $m_i$ as:

$$L_{i,p} = \Sigma_{j=1}^{q} w_{i,p,j} L^*_{i,p,j} \quad (2)$$

where each $w_{i,p,j}$ is a weight associated with $b_{i,p,j}^{r}$. In an example, all weights are simply set to be 1 to treat all blocks equally. In other examples, some blocks may be treated with more attention than others, and an attention map (or significance map) can be used to obtain the weights.

Repeating the same process (the workflow (200)) for all P ways of partition results in the quality loss $L_{i,p}$, $p=1, \ldots, P$. The optimal way of partition $p^*$ can then be selected, for example, as the partition with the optimal loss: $p^* = \text{argmin}_p L_{i,p}$, $L^*_i = \min_p L_{i,p}$. The corresponding block selection signals $S_{i,p^*_1}^{k} = \{s_{i,p^*,1}, \ldots s_{i,p^*,q}\}$ can also be determined as an output of the Iterative Partition Selection module (102).

Let $B_{i,p^*_1}^{n_{p^*}} = \{b_{i,p^*,1}, \ldots, b_{i,p^*,n_{p^*}}\}$ denote the selected optimally partitioned blocks for micro-block $m_i$. According to the block selection signal $s_{i,p^*,j}$, the corresponding compressed $\tilde{r}_{i,p^*,j}^{r}$ or $\tilde{b}_{i,p^*,j}^{r}$ can also be determined to be the actual compressed representation $\tilde{b}_{i,p^*,j}^{r}$ for block $b_{i,p^*,j}^{r}$. The set of compressed representations $\tilde{B}_{i,p^*_1}^{q} = \{\tilde{b}_{i,p^*,1}, \ldots, \tilde{b}_{i,p^*,q}\}$ are also output from the Iterative Partition Selection module (102). The optimal partition $p^*$, the compressed representation $\tilde{B}_{i,p^*_1}^{q}$, and the block selection signals $S_{i,p^*_1}^{q}$ are further encoded, for example, through quantization and entropy encoding, to generate encoded bits in an encoded stream and sent to a decoder. In some examples, the optimal partition $p^*$, the compressed representation $\tilde{B}_{i,p^*_1}^{q}$, and the block selection signals $S_{i,p^*_1}^{q}$ are further encoded are represented by some syntax elements that are encoded and transmitted to a decoder.

The Neural Compression module (221), the Neural Decompression module (222), the Residual Neural Compression module (213), and the Residual Neural Decompression module (214) can use any neural compression methods. This disclosure does not put any restrictions on the specific methods or network architectures used for these modules.

Figure 3:
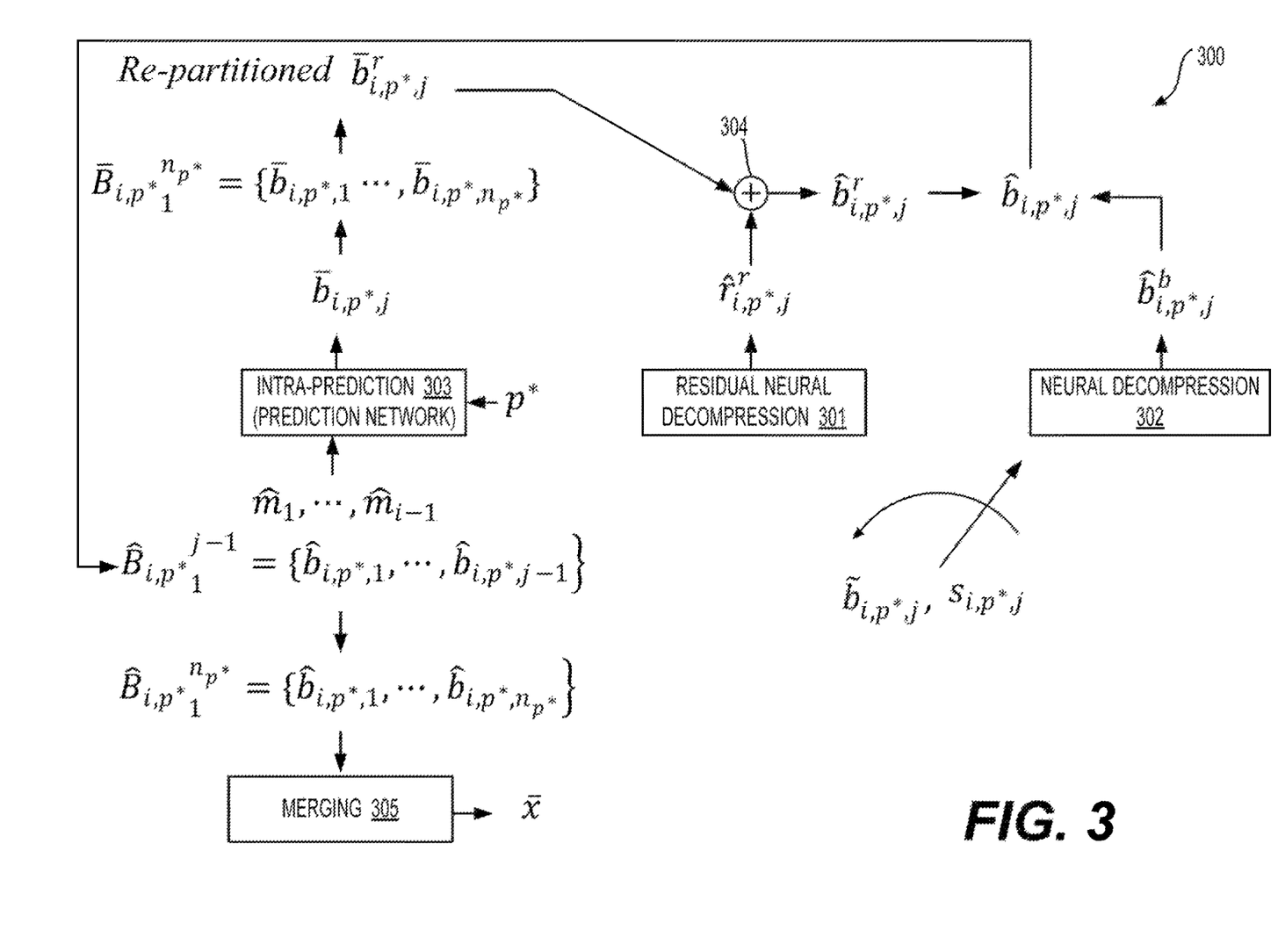
FIG. 3 shows an exemplary workflow (300) of a decoder according to embodiments of the disclosure.

FIG. 3 shows an exemplary workflow (300) of a decoder according to embodiments of the disclosure. The decoder can operate as a video decoder or an image decoder. The decoder can include a Residual Neural Decompression module (301), a Neural Decompression module (302), an Intra-Prediction module (303), a Merging module (305), and an Addition module (304). Those components are coupled together as shown in FIG. 3.

In an embodiment, on the decoder side, the system (the decoder) in FIG. 3 receives the optimal partition $p^*$, the compressed representation $\tilde{B}_{i,p^*_1}^{q}$, and the block selection signals $S_{i,p^*_1}^{q} = \{s_{i,p^*,1}, \ldots s_{i,p^*,q}\}$ (typically recovered from a received bitstream by entropy decoding and dequantization). Based on each block selection signal $s_{i,p^*,j}$, the system selects one of the following methods to compute the recovered block $\hat{b}_{i,p^*,j}$. If the signal $s_{i,p^*,j}$ indicates that the recovered block comes from the decoded block based on the compressed representation $\tilde{b}_{i,p,j}^r$ (corresponding to a re-partitioned estimated block $b_{i,p,j}^r$) on the encoder side (the encoder in FIG. 1), the Neural Decompression module (302) can be used to compute the recovered block $\hat{b}_{i,p^*,j}^b$.

If the signal $s_{i,p^*,j}$ indicates that the recovered block comes from the decoded block based on the compressed residual representation $\tilde{r}_{i,p,j}^r$ (corresponding to a re-partitioned residual block $r_{i,p,j}^r$) on the encoder side, the Residual Neural Decompression module (301) can be used to compute recovered residual $\hat{r}_{i,p^*,j}^r$.

In an embodiment, in the case where recovered residual $\hat{r}_{i,p^*,j}^r$ is used, based on the set of previously recovered blocks $\hat{B}_{i,p^*_1}^{j-1}=\{\hat{b}_{i,p^*,1}, \ldots, \hat{b}_{i,p^*,j-1}\}$ and previously recovered micro-blocks $\hat{m}_1, \ldots, \hat{m}_{i-1}$, the Intra-Prediction module (303) computes the predicted intra-prediction block $\overline{b}_{i,p^*,j}$ by using the Prediction Network in the same way as the encoder side. In an embodiment, the difference between operations of the Intra-Prediction module (303) and the Intra-Prediction module (211) is that the input of the Prediction Network are formed by pixels of the estimated blocks and micro-blocks on the encoder side but are from the corresponding recovered blocks and micro-blocks on the decoder side.

Based on the predicted intra-prediction blocks, $\overline{B}_{i,p^*_1}^{n_{p^*}}=\{\overline{b}_{i,p^*,1} \ldots, \overline{b}_{i,p^*,n_{p^*}}\}$, a re-partitioned predicted block $\overline{b}_{i,p^*,j}^r$ can be obtained in the same way as the encoder side. The recovered residual $\hat{r}_{i,p^*,j}^r$ can then be added back to the re-partitioned (in the same way as the encoder side) predicted block $\overline{b}_{i,p^*,j}^r$ at the Addition module (304) to obtain the recovered block $\hat{b}_{i,p^*,j}^r$.

Either $\hat{b}_{i,p^*,j}^r$ or $\hat{b}_{i,p^*,j}^b$ will give the actual recovered block $\hat{b}_{i,p^*,j}$, and the decoder moves on to process the next re-partitioned block.

Finally, the recovered blocks $\hat{B}_{i,p^*_1}^{n_{p^*}}=\{\hat{b}_{i,p^*,1}, \ldots, \hat{b}_{i,p^*,n_{p^*}}\}$ of micro-block $m_i$ (resulting from the recovered $\hat{B}_{i,p^*_1}^{q}=\{\hat{b}_{i,p^*,1}, \ldots, \hat{b}_{i,p^*,n_{p^*}}\}$ can be aggregated into the reconstructed image $\tilde{x}$ in the Merging module (305). In some embodiments, the Merging module (305) can further process the recovered blocks to remove the artifacts, such as deblocking, denoising, and the like. This disclosure does not put any restrictions on the specific methods how the recovered blocks are aggregated into the reconstructed image $\hat{x}$.

Figure 4:
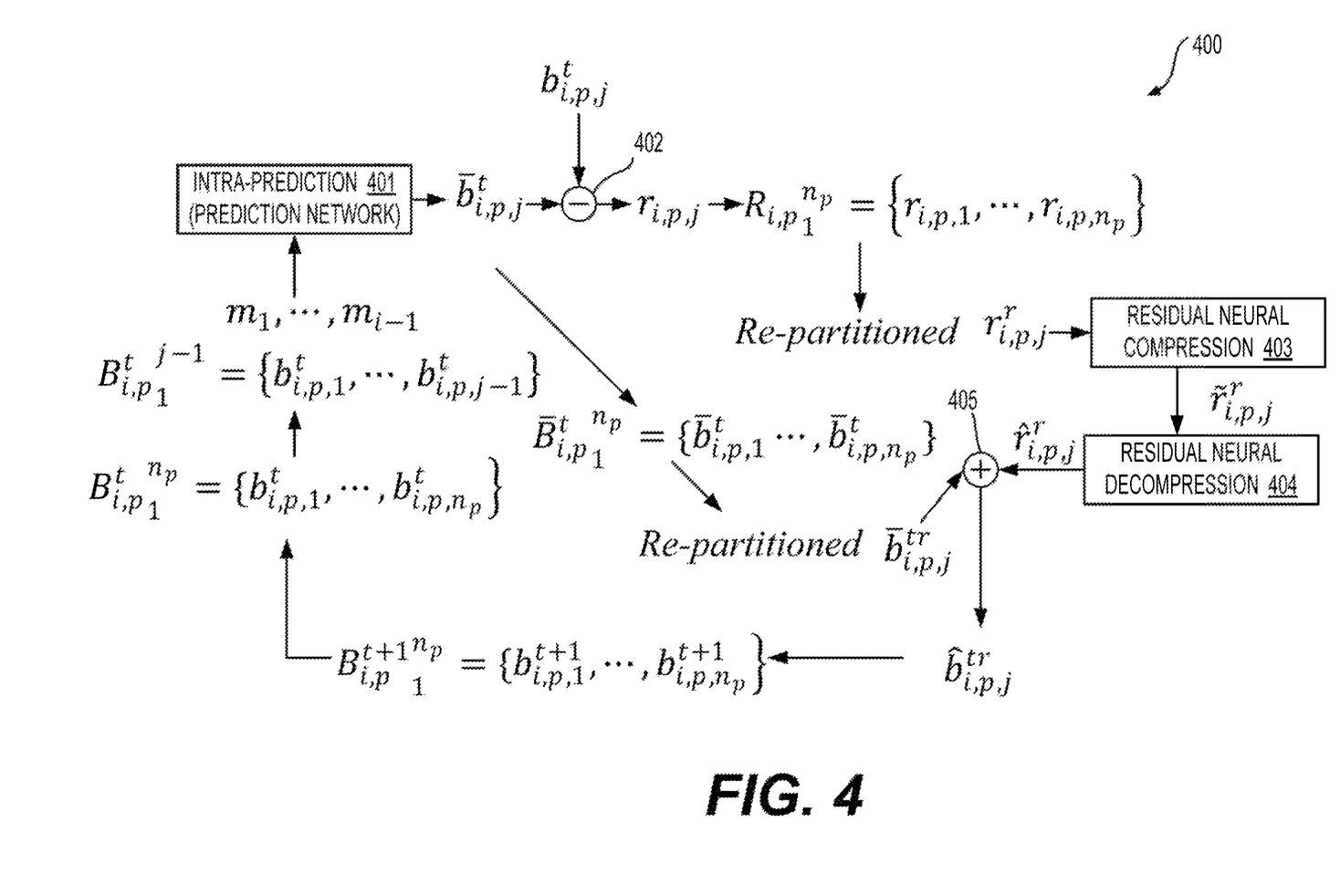
FIG. 4 shows an exemplary workflow (400) of the Iterative Prediction Estimation module (201) in the FIG. 2 example according to embodiments of the disclosure.

FIG. 4 shows an exemplary workflow (400) of the Iterative Prediction Estimation module (201) in the FIG. 2 example according to embodiments of the disclosure. The Iterative Prediction Estimation module (201) can include an Intra-Prediction module (401), an Addition module (402), a Residual Neural Compression module (403), a Residual Neural Decompression module (404), and an Addition module (405). Those components are coupled together as shown in FIG. 4.

In the workflow (400), estimated intra-prediction blocks of a micro-block can be determined in an iterative manner. The estimated intra-prediction blocks determined in such a way can provide a better basis for the subsequent intra-prediction and residual block generation in the workflow (200) compared with using the original micro-block directly for intra-prediction and residual block generation. For example, the resulting residual blocks based on the estimated blocks can include fewer residues and can be coded with fewer bits. Therefore, the R-D performance of the encoder in the FIG. 2 example can be improved.

Assume that for the t-th iteration, there are a set of current estimated blocks $B_{i,p_1}^{t^n_p}=\{b_{i,p,1}^t, \ldots, b_{i,p,n_p}^t\}$. In an embodiment, for the first iteration, $B_{i,p_1}^{t^n_p}=\{b_{i,p,1}, \ldots, b_{i,p,n_p}\}$ (with the current partition p) is initialized as $B_{i,p_1}^{org^n_p}=\{b_{i,p,1}^{org}, \ldots, b_{i,p,n_p}^{org}\}$. For each estimated block $b_{i,p,j}^t$, a predicted block $\overline{b}_{i,p,j}^t$ can be computed by the Intra-Prediction module (401) based on the Prediction Network shown in FIG. 4. The Prediction Network takes as input a set of image pixels selected from the estimated blocks $B_{i,p_1}^{j-1}=\{b_{i,p,1}^t, \ldots, b_{i,p,j-1}^t\}$ that are encoded before $b_{i,p,j}^t$. The same as in the FIG. 2 examples, in some embodiments, the selected pixels can also come from the estimated micro-blocks that are encoded before $m_i$. Through inference computation, the Prediction Network outputs the predicted block $\overline{b}_{i,p,j}^t$. Then the residual $r_{i,p,j}$ can be computed based on $b_{i,p,j}$ and $\overline{b}_{i,p,j}^t$ at the Addition module 402.

The overall residual $R_{i,p_1}^{n_p}=\{r_{i,p,1}, \ldots, r_{i,p,n_p}\}$ can be re-partitioned into a set of q re-partitioned residual blocks $R_{i,p_1}^{r^q}=\{r_{i,p,1}^r, \ldots, r_{i,p,q}^r\}$. The corresponding estimated micro-block $B_{i,p_1}^{t^r_p}$ and predicted blocks $\overline{B}_{i,p_1}^{t^r_p}=\{\overline{b}_{i,p,1}^t \ldots, \overline{b}_{i,p,n_p}^t\}$ can also be re-partitioned in the same way into $B_{i,p_1}^{t^r}=\{b_{i,p,1}^{tr}, \ldots, b_{i,p,q}^{tr}\}$ and $\overline{B}_{i,p_1}^{t^r}=\{\overline{b}_{i,p,1}^{tr}, \ldots, \overline{b}_{i,p,q}^{tr}\}$, respectively. For each residual block $r_{i,p,j}^r$, it can be compressed by the Residual Neural Compression module (403) to compute the compressed representation $\tilde{r}_{i,p,j}^r$, which is decompressed by the Residual Neural Decompression module (404) to compute the recovered residual block $\hat{r}_{i,p,j}^r$. The recovered residual block can be added back to the corresponding re-partitioned predicted block $\overline{b}_{i,p,j}^{tr}$ to obtain a reconstructed block $\hat{b}_{i,p,j}^{tr}$.

Finally, all reconstructed blocks form the reconstructed estimated blocks $B_{i,p_1}^{t+1^n_p}=\{b_{i,p,1}^{t+1}, \ldots, b_{i,p,n_p}^{t+1}\}$, which is sent back to the Prediction Network as input, and the system goes into the next iteration t+1. Typically multiple iterations will be performed, for example, until the estimated blocks converge or reaching a maximum iteration number. The final reconstructed estimated blocks generated in the last iteration are the output estimated blocks $B_{i,p_1}^{n_p}=\{b_{i,p,1}, \ldots, b_{i,p,n_p}\}$ of the Iterative Prediction Estimation module (201).

Note that the Iterative Prediction Estimation module (201) can mimic the whole encoding and decoding process in some other embodiments. That is, for each iteration t, the Iterative Prediction Estimation module (201) runs a full encoding and decoding procedure. In the encoding process described in the FIG. 2 example, $B_{i,p_1}^{n_p}=\{b_{i,p,1}, \ldots, b_{i,p,n_p}\}$ can be replaced by $B_{i,p_1}^{t^{j-1}}=\{b_{i,p,1}^t, \ldots, b_{i,p,j-1}^t\}$ (or, in another form, $B_{i,p_1}^{t^p}=\{b_{i,p,1}^t, \ldots, b_{i,p,n_p}^t\}$), and output the optimal partition p* (the current partition way p), the compressed representation $\tilde{B}_{i,p^*_1}^{q}$, and the block selection signals $S_{i,p^*_1}^{q}$. Then in the decoding process described in the FIG. 3 example, the reconstructed image is fed back to the Iterative Prediction Estimation module (201) again as input $B_{i,p_1}^{t+1^{j-1}}=\{b_{i,p,1}^{t+1}, \ldots, b_{i,p,j-1}^{t+1}\}$ of the next iteration.

III. Training Process

Figure 5:
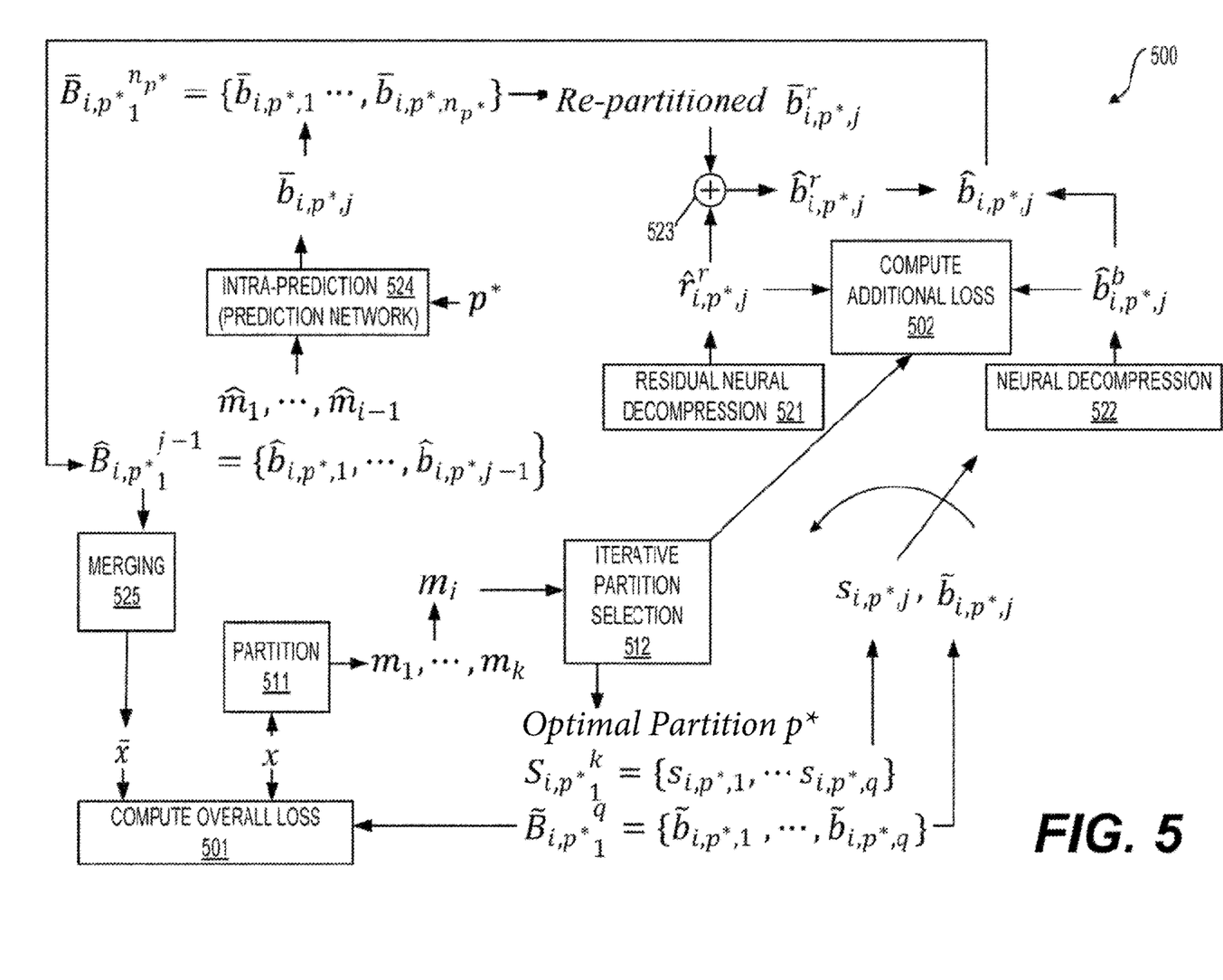
FIG. 5 shows an exemplary workflow (500) of a training process according to embodiments of the disclosure.

FIG. 5 shows an exemplary workflow (500) of a training process according embodiments of the disclosure. The training process can be performed over the following components: a Partition module (511), an Iterative Partition Selection module (512), a Residual Neural Decompression module (521), a Neural Decompression module (522), an Addition module (523), an Intra-Prediction module (524), a Merging module (525), a Compute Addition Loss module (502), and a Compute Overall Loss (501). Those components are coupled together as shown in FIG. 5.

The target of the training process is to learn or train neural networks (or neural network models) that are used in the examples of FIGS. 1-4. For example, neural networks in the modules (521), (522), (524), and (525) after being trained can be used in the modules (301), (302), (303), and (305), respectively. Neural networks in the module 512 (which can have a similar structure as the module (102)) can be used in the module (102) (that includes the modules (201), (211), (213), (214), (221), (222), and (231)). The module (201) includes the modules (401), (403), and (404).

In some embodiments, the Intra-Prediction modules (211), (303), and (401) can share a same neural network; the Residual Neural Compression modules (213) and (403) can share a same neural network; the Residual Neural Decompression modules (214), (301), and (404) can share a same neural network; and the Neural Decompression modules (222) and (302) can share a same neural network. In other embodiments, the above modules may not share the same neural networks.

In some embodiments, the Merging modules (305) and (525) and the Block Selection modules (231) are implemented with neural networks. For example, an NN is used for aggregating recovered blocks into the recovered image. The corresponding learnable parameters can also be learned in the training process. In other embodiments, the Merging modules (305) and (525) and the Block Selection modules (231) may not be implemented using neural networks. Accordingly, no corresponding neural networks are trained during the training process.

In an embodiment, in the training process, the weight coefficients of the above networks and modules to be learned, for example, can be initialized by using pre-trained models or by setting their parameters to random numbers. Then, given an input training image x, it is passed through the encoding process described in FIG. 1 (passing through the modules (511) and (512) in FIG. 5) to compute the optimal partition p*, the compressed representation $\tilde{B}_{i,p*_1}^q = \{\tilde{b}_{i,p*,1}, \ldots, \tilde{b}_{i,p*,q}\}$ and the block selection signals $S_{i,p*_1}^k = \{s_{i,p*,1}, \ldots, s_{i,p*,q}\}$ for each micro-block $m_i$, and followed by the decoding process described in FIG. 3 (passing through the modules (521) and (523)-(525) or (522) and (524)-(525)) to generate the final reconstructed image x.

In an embodiment, a distortion loss D(x, $\bar{x}$) can be computed, such as the traditional Peak Signal-to-Noise Ratio (PSNR), Multiscale Structural Similarity (MS-SSIM), or a weighted combination of both. In an embodiment, a rate loss $$R(\tilde{B}_{i,p_1^*}^q)$$

can be computed to measure the bit consumption of the compressed representation $$\tilde{B}_{i,p_1^*}^q.$$

Therefore, an overall R-D loss $L(x, \bar{x}, \tilde{B}, \tilde{B}_{1,p*_1}^q, \ldots, \tilde{B}_{k,p*_1}^q)$ can be computed in the Compute Overall Loss module (501):

$$L(x, \bar{x}, \tilde{B}_{1,p_1^*}^q, \ldots, \tilde{B}_{k,p_1^*}^q) = \alpha D(x, \bar{x}) + \sum_{i=1}^{k} \beta_i R(\tilde{B}_{i,p_1^*}^q) \quad (1)$$

Where $\alpha$, $\beta_i$ are hyperparameters balancing the importance of different terms.

In some embodiments, other forms of loss, such as the distortion loss $D(r_{i,p*_j}^r, \hat{r}_{i,p*_j}^r)$ between the recovered residual $\hat{r}_{i,p*_j}^r$ and the original residual $r_{i,p*_j}^r$, and the distortion loss $D(b_{i,p*_j}^r, \hat{b}_{i,p*_j}^r)$ can also be computed in a Compute Additional Loss module (502), e.g., the Mean Square Error (MSE) or Structural Similarity (SSIM) measurements. $D(r_{i,p*_j}^r, \hat{r}_{i,p*_j}^r)$ and $D(b_{i,p*_j}^r, \hat{b}_{i,p*_j}^r)$ can also be optionally combined with $$L(x, \bar{x}, \tilde{B}_{1,p_1^*}^q, \ldots, \tilde{B}_{k,p_1^*}^q)$$

into a final loss of the whole system.

The gradient of the overall loss or the final loss can be computed and back-propagated to update the learnable parameters in the system. Note that, different components (i.e., networks or modules) can be updated at different times with different updating frequencies. In some embodiments, some components or part of the parameters in some components can be pre-trained and fixed, and the training process only updates the remaining parameters.

The techniques disclosed herein provide a flexible framework for improving the performance of neural image compression. Multiple ways of partitions can be tested for intra-prediction to select an optimal partition to adapt to characteristics of the image under processing. Also, the partition for intra-prediction residual generation and the partition for residual compression can be decoupled such that optimal partitions can be independently determined and applied for intra-prediction and for residual compression. Further, two coding methods can be adaptively selected for a re-partitioned block based on the quality losses of the two coding methods.

Figure 6:
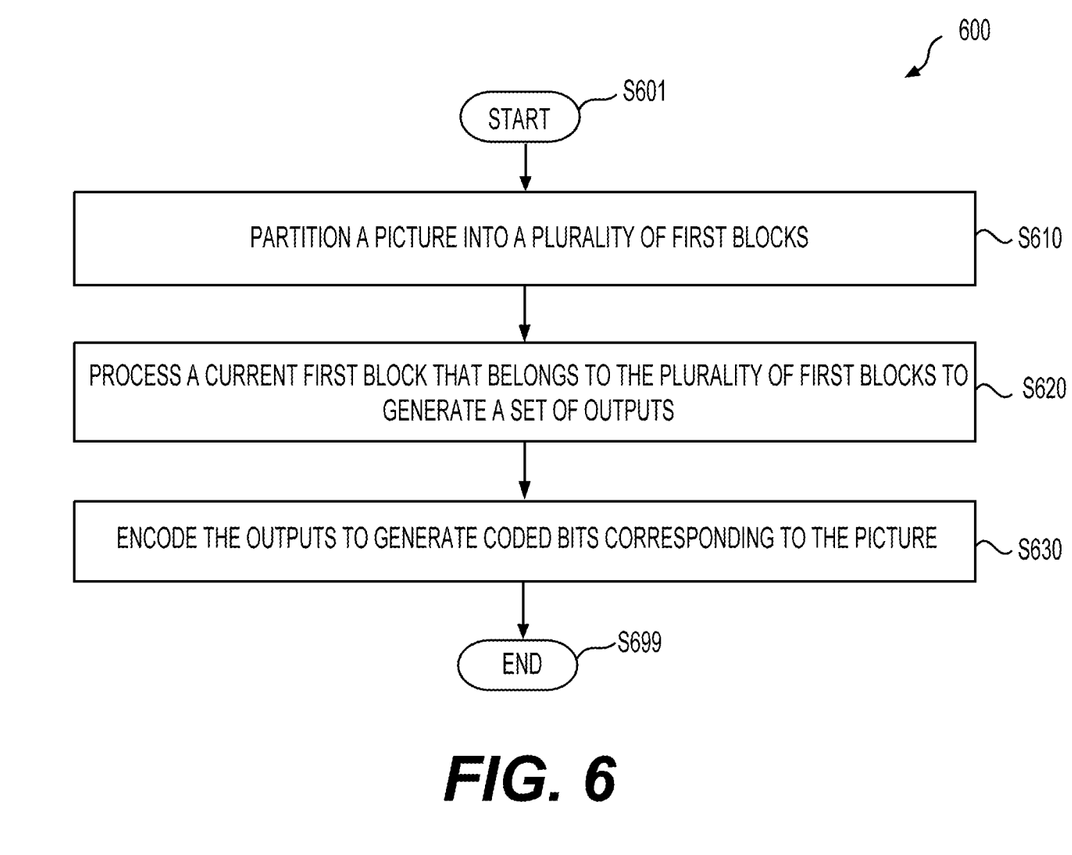
FIG. 6 shows a video encoding process (600) according to an embodiment of the disclosure.

IV. Video Coding Processes Based on the Adaptive Iterative Intra-Prediction Framework FIG. 6 shows a video encoding process (600) according to an embodiment of the disclosure. The process (600) can be performed at the encoder in the FIG. 1 example. The process (600) can start from (S601) and proceed to (S610).

At (S610), a picture in a video sequence can be partitioned into a plurality of first blocks. In an example, the first blocks can be aligned with CTUs partitioned from the picture.

At (S620), a current first block that belongs to the plurality of first blocks can be processed to generate the following outputs: an optimal partition indicating how the current first block is partitioned into second blocks for intra-prediction, a set of block selection signals, wherein the current first block is re-partitioned into third blocks, and each block selection signal corresponds to one of the third blocks and indicates whether the respective third block is coded using a first coding method or a second coding method, and a set of compressed representations each corresponding to one of the third blocks.

In an example, an estimated block of the current first block partitioned with the optimal partition can first be generated based on an iterative prediction estimation NN. The estimated block can include estimated second blocks corresponding to the second blocks. In an embodiment, the estimated block of the current first block can be generated in an iterative manner. For example, in a current iteration, a set of current estimated second blocks of the current first block, and, optionally, estimated blocks of the first blocks that are processed prior to the current first block, can first be used as an input to an intra-prediction NN to generate predicted second blocks corresponding to the current estimated second blocks of the current first block.

Residual second blocks corresponding to the predicted second blocks can then be generated. The collection of the residual second blocks can then be re-partitioned into residual third blocks corresponding to the third blocks. Thereafter, the residual third blocks can be compressed based on a residual neural compression NN to generate compressed third blocks. The compressed third blocks can then be decompressed, based on a residual neural decompression NN, to recover the residual third blocks. The recovered residual third blocks can be combined with the corresponding predicted second blocks to generate reconstructed second blocks. Finally, the reconstructed second blocks can be used in place of the set of current estimated second blocks as an input to a next iteration.

In an embodiment, for each third block that is coded using the first coding method, the estimated second blocks in the respective third block can be compressed, based on a neural compression NN, to generate the respective compressed representation of the respective third block. For each third block that is coded using the second coding method, an intra-prediction can be performed to generate predicted second blocks. Based on the predicted second blocks, a residual block for each second block in the respective third block can be generated. The residual blocks of the respective third block can be compressed, based on a residual neural compression NN, to generate the respective compressed representation of the respective third block.

In an embodiment, the intra-prediction to generate the residual block for each second block in the respective third block can be based on (1) estimated second blocks processed prior to the estimated second block of the respective second block in the estimated block of the current first block, and (2) one or more estimated blocks of the first blocks that are processed prior to the current first block.

In an embodiment, for each third block, a first rate-distortion (R-D) loss corresponding to the third block being encoded with the first coding method and a second R-D loss corresponding to the third block being encoded with the second coding method can be generated. Then, based on the first and second R-D losses, the block selection signal of the third block to indicate which one of the first and second coding methods is selected for coding the third block can be generated.

In an embodiment, a first overall loss of the current first block corresponding to the optimal partition for partitioning the current first block into the second blocks can be generated. The first overall loss can be a combination of an R-D loss of each third block corresponding to the selected one of the first and second coding methods for the respective third block. Also, a second overall loss of the current first block corresponding to each of a plurality of different ways, other than the optimal partition, for partitioning the current first block into second blocks can be generated. By comparing the first and second overall losses, the first overall loss of the current first block corresponding to the optimal partition can be determined to be the smallest loss among the first and second overall losses.

At (S630), the outputs can be encoded, for example, by quantization and/or entropy coding, to generate coded bits corresponding to the picture. The coded bits can be transmitted in a bitstream corresponding to the video sequence or can be stored in a storage medium. The process (600) can proceed to (S699) and terminate.

Figure 7:
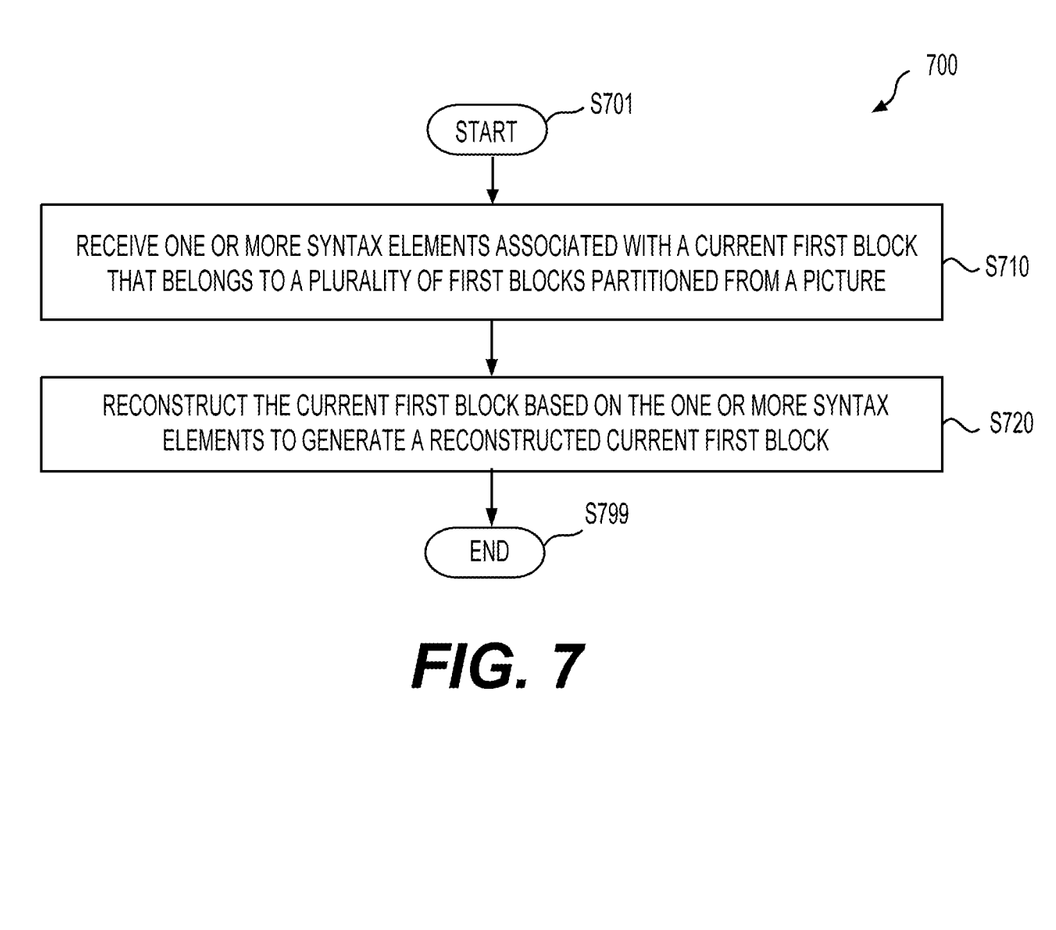
FIG. 7 shows a video decoding process (700) according to an embodiment of the disclosure.

FIG. 7 shows a video decoding process (700) according to an embodiment of the disclosure. The process (700) can be performed at the decoder in the FIG. 3 example. The process (700) can start from (S701) and proceed to (S710).

At (S710), one or more syntax elements associated with a current first block can be received. The first block belongs to a plurality of first blocks partitioned from a picture. The one or more syntax elements can indicate an optimal partition indicating how the current first block is partitioned into second blocks for intra-prediction, a set of block selection signals, wherein the current first block is re-partitioned into third blocks, each block selection signal corresponds to one of the third blocks and indicates whether the respective third block is coded using a first coding method or a second coding method, and a set of compressed representations each corresponding to one of the third blocks.

At (S720), the current first block can be reconstructed based on the one or more syntax elements, resulting in a reconstructed current first block. In an embodiment, for each third block that is coded using the first coding method as indicated by a respective one of the set of block selection signals, a reconstructed third block can be generated based on a neural decompression NN with the respective compressed representation of the third block as an input to the neural decompression NN.

For each third block that is coded using the second coding method as indicated by a respective one of the set of block selection signals, a residual third block can be generated based on a residual neural decompression NN with the respective compressed representation of the third blocks as an input to the residual neural decompression NN. For each third block that is coded using the second coding method, a reconstructed third block can then be generated based on the respective residual third block and a respective predicted third block.

In an embodiment, for each third block that is coded using the second coding method, an intra-prediction can be performed based on an intra-prediction NN with previously reconstructed first blocks and previously generated reconstructed third blocks as an input to the intra-prediction NN to generate a set of predicted second blocks corresponding to the respective third block. The set of predicted second blocks corresponding to the respective third block forms the respective predicted third block. In an embodiment, for each third block that is coded using the second coding method, the respective intra-prediction is performed with the optimal partition as an input to the intra-prediction NN.

In an embodiment, the reconstructed third blocks corresponding to the third blocks that are coded using either the first or second coding method are merged to generate the reconstructed current first block. The process (700) can proceed to (S799) and terminate.

V. Computer System

The techniques (e.g., functions, modules, elements, methods, processes, operations in various embodiments or examples) disclosed herein can be implemented by processing circuitry (e.g., one or more processors or one or more integrated circuits). In some examples, the techniques can be implemented as computer software using computer-readable instructions and physically stored in one or more computer-readable media.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
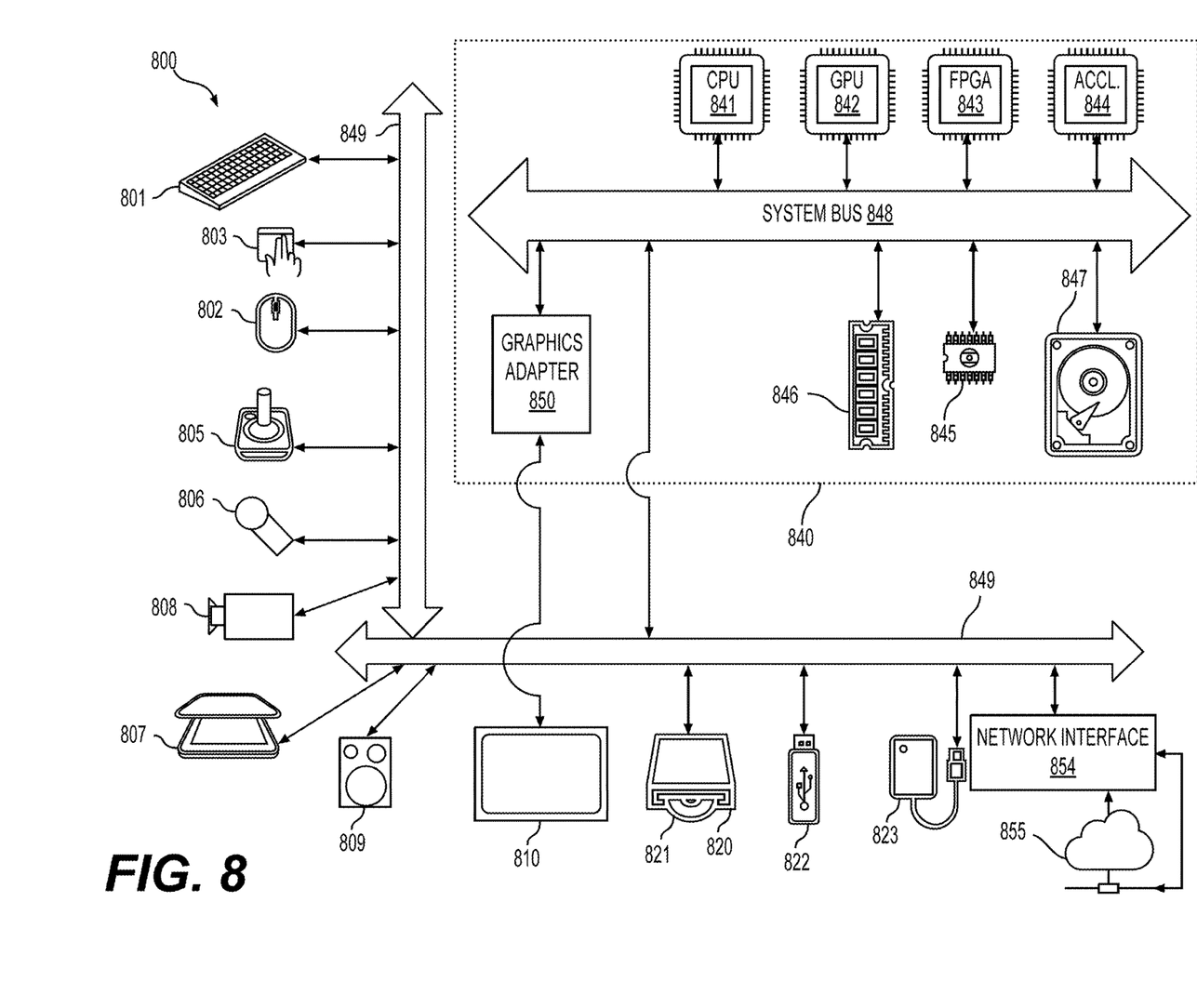
FIG. 8 shows a computer system (800) suitable for implementing certain embodiments of the disclosed subject matter.

FIG. 8 shows a computer system (800) suitable for implementing certain embodiments of the disclosed subject matter. The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), and camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability-some of which may be capable to output two-dimensional visual output or more than three-dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid-state drive (823), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (800) can also include an interface (854) to one or more communication networks (855). The one or more networks (855) can for example be wireless, wireline, optical. The one or more networks (855) can further be local, wide-area, metropolitan, vehicular and industrial, real-time, delay-tolerant, and so on. Examples of the one or more networks (855) include local area networks such as Ethernet, wireless LANs, cellular networks to include GSM, 3G, 4G, 5G, LTE and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example, to other computer systems using local or wide area digital networks. Certain protocols and protocol stacks can be used on each of those networks and network interfaces as described above.

The aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850) and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieval to any of the memory devices can be enabled through the use of cache memory, that can be closely associated with one or more CPU (841), GPU (842), mass storage (847), ROM (845), RAM (846), and the like.

The computer-readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example, accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
   receiving one or more syntax elements associated with a current first block that belongs to a plurality of first blocks partitioned from a picture, the one or more syntax elements indicating:
      an optimal partition indicating how the current first block is partitioned into second blocks for intra-prediction,
      a set of block selection signals, wherein the current first block is re-partitioned into third blocks of different size than the second blocks, each block selection signal corresponds to one of the third blocks and indicates whether the respective third block is coded using a first coding method based on a neural decompression neural network (NN) or a second coding method based on a residual neural decompression NN, and
      a set of compressed representations each corresponding to one of the third blocks; and
   reconstructing the current first block based on the one or more syntax elements to generate a reconstructed current first block.

2. The method of claim 1, wherein the reconstructing comprises:
   for each third block that is coded using the first coding method as indicated by a respective one of the set of block selection signals, generating a reconstructed third block based on the neural decompression NN with the respective compressed representation of the third block as an input to the neural decompression NN; and
   for each third block that is coded using the second coding method as indicated by a respective one of the set of block selection signals, generating a residual third block based on the residual neural decompression NN with the respective compressed representation of the third blocks as an input to the residual neural decompression NN.

3. The method of claim 2, wherein the reconstructing further comprises:
   for each third block that is coded using the second coding method, generating a reconstructed third block based on the respective residual third block and a respective predicted third block.

4. The method of claim 3, wherein the reconstructing further comprises:
   for each third block coded using the second coding method, performing an intra-prediction based on an intra-prediction NN with previously reconstructed first blocks and previously generated reconstructed third blocks as an input to the intra-prediction NN to generate a set of predicted second blocks corresponding to the respective third block.

5. The method of claim 4, wherein the set of predicted second blocks corresponding to the respective third block forms the respective predicted third block.

6. The method of claim 5, wherein the reconstructing further comprises:
   for each third block that is coded using the second coding method, the respective intra-prediction is performed with the optimal partition, indicating how the current first block is partitioned into the second blocks for intra-prediction, as the input to the intra-prediction NN.

7. The method of claim 3, wherein the reconstructing further comprises:
   merging the reconstructed third blocks corresponding to the third blocks that are coded using either the first or second coding method to generate the reconstructed current first block.

8. An apparatus of video decoding at a video decoder, comprising:
   processing circuitry configured to:
      receive one or more syntax elements associated with a current first block that belongs to a plurality of first blocks partitioned from a picture, the one or more syntax elements indicating:
         an optimal partition indicating how the current first block is partitioned into second blocks for intra-prediction,
         a set of block selection signals, wherein the current first block is re-partitioned into third blocks of different size than the second blocks, each block selection signal corresponds to one of the third blocks and indicates whether the respective third block is coded using a first coding method based on a neural decompression neural network (NN) or a second coding method based on a residual neural decompression NN, and
         a set of compressed representations each corresponding to one of the third blocks; and
      reconstruct the current first block based on the one or more syntax elements to generate a reconstructed current first block.

9. The apparatus of claim 8, wherein the processing circuitry is further configured to:
   for each third block that is coded using the first coding method as indicated by a respective one of the set of block selection signals, generate a reconstructed third block based on the neural decompression NN with the respective compressed representation of the third block as an input to the neural decompression NN; and for each third block that is coded using the second coding method as indicated by a respective one of the set of block selection signals, generate a residual third block based on the residual neural decompression NN with the respective compressed representation of the third blocks as an input to the residual neural decompression NN.

10. The apparatus of claim 9, wherein the processing circuitry is further configured to:
for each third block that is coded using the second coding method, generate a reconstructed third block based on the respective residual third block and a respective predicted third block.

11. The apparatus of claim 10, wherein the processing circuitry is further configured to:
for each third block coded using the second coding method, perform an intra-prediction based on an intra-prediction NN with previously reconstructed first blocks and previously generated reconstructed third blocks as an input to the intra-prediction NN to generate a set of predicted second blocks corresponding to the respective third block.

12. The apparatus of claim 11, wherein the set of predicted second blocks correspond to the respective third block forms the respective predicted third block.

13. The apparatus of claim 12, wherein the processing circuitry is further configured to:
for each third block that is coded using the second coding method and for which the respective intra-prediction is performed with the optimal partition, indicate how the current first block is partitioned into the second blocks for intra-prediction, as the input to the intra-prediction NN.

14. The apparatus of claim 10, wherein the processing circuitry is further configured to:
merge the reconstructed third blocks corresponding to the third blocks that are coded using either the first or second coding method to generate the reconstructed current first block.

15. A non-transitory computer-readable medium storing instructions that, when executed by a processor, cause the processor to perform a method of video decoding, the method comprising:
receiving one or more syntax elements associated with a current first block that belongs to a plurality of first blocks partitioned from a picture, the one or more syntax elements indicating:
an optimal partition indicating how the current first block is partitioned into second blocks for intra-prediction,
a set of block selection signals, wherein the current first block is re-partitioned into third blocks of different size than the second blocks, each block selection signal corresponds to one of the third blocks and indicates whether the respective third block is coded using a first coding method based on a neural decompression neural network (NN) or a second coding method based on a residual neural decompression NN, and
a set of compressed representations each corresponding to one of the third blocks; and
reconstructing the current first block based on the one or more syntax elements to generate a reconstructed current first block.

16. The non-transitory computer-readable medium of claim 15, wherein the reconstructing comprises:
for each third block that is coded using the first coding method as indicated by a respective one of the set of block selection signals, generating a reconstructed third block based on the neural decompression NN with the respective compressed representation of the third block as an input to the neural decompression NN; and
for each third block that is coded using the second coding method as indicated by a respective one of the set of block selection signals, generating a residual third block based on the residual neural decompression NN with the respective compressed representation of the third blocks as an input to the residual neural decompression NN.

17. The non-transitory computer-readable medium of claim 16, wherein the reconstructing further comprises:
for each third block that is coded using the second coding method, generating a reconstructed third block based on the respective residual third block and a respective predicted third block.

18. The non-transitory computer-readable medium of claim 17, wherein the reconstructing further comprises:
for each third block coded using the second coding method, performing an intra-prediction based on an intra-prediction NN with previously reconstructed first blocks and previously generated reconstructed third blocks as an input to the intra-prediction NN to generate a set of predicted second blocks corresponding to the respective third block.

19. The non-transitory computer-readable medium of claim 18, wherein the set of predicted second blocks correspond to the respective third block forms the respective predicted third block.

20. The non-transitory computer-readable medium of claim 19, wherein the reconstructing further comprises:
for each third block that is coded using the second coding method, the respective intra-prediction is performed with the optimal partition, indicating how the current first block is partitioned into the second blocks for intra-prediction, as the input to the intra-prediction NN.

* * * * *